United States Patent
Hageman et al.

[11] Patent Number: 5,720,170
[45] Date of Patent: Feb. 24, 1998

[54] MASTER CYLINDER AND EMULATOR WITH APPLY ASSIST

[75] Inventors: John Benjamin Hageman; Donald Edward Schenk, both of Vandalia, Ohio

[73] Assignee: General Motors Corporation, Detroit, Mich.

[21] Appl. No.: 685,063

[22] Filed: Jul. 22, 1996

[51] Int. Cl.⁶ ............................................. B60T 11/20
[52] U.S. Cl. ............................ 60/562; 60/576; 60/591
[58] Field of Search ........................ 60/562, 565, 568, 60/569, 574, 575, 576, 577, 578, 581, 582, 591

[56] References Cited

U.S. PATENT DOCUMENTS

| | | | |
|---|---|---|---|
| 2,154,111 | 4/1939 | Rossmann | 60/575 |
| 2,206,742 | 7/1940 | Dodge | 60/576 |
| 2,313,274 | 3/1943 | Schnell | 60/577 |
| 4,373,333 | 2/1983 | Coleman | 60/578 |
| 5,246,283 | 9/1993 | Shaw et al. | 303/115.2 |

FOREIGN PATENT DOCUMENTS 2084676  4/1982  United Kingdom ............... 60/582

*Primary Examiner*—F. Daniel Lopez
*Attorney, Agent, or Firm*—Jeffrey A. Sedlar

[57] ABSTRACT

A master cylinder and emulator includes a primary piston and a secondary piston which are movable to provide fluid pressure to effect wheel braking in a vehicle. In addition, the master cylinder includes an emulator assembly which supplies conventional pedal feel and travel characteristics when the primary and secondary pistons are substantially immovable due to isolation of the master cylinder from the wheel brakes. The emulator assembly includes a piston that is movable against a selected amount of fluid pressure and spring force while the primary piston remains stationary. The fluid force is supplied by controlling the flow of fluid from behind the piston through a flow restrictive orifice to a conventional fluid reservoir on the master cylinder assembly. The master cylinder and emulator assembly is operable to provide brake actuation assist to an electric or electro-hydraulically controlled braking system.

10 Claims, 3 Drawing Sheets

MASTER CYLINDER AND EMULATOR WITH APPLY ASSIST

BACKGROUND OF THE INVENTION

The present invention relates to a master cylinder and emulator with apply assist and more particularly, to an integral master cylinder and pedal feel emulator for use with a braking system that does not have the typical inherent compliance associated with brake apply operation wherein brake apply is assisted by operation of the emulator.

With a brake by wire vehicle braking system wherein the application of fluid brake pressure to the wheel brakes is controllable by an electric or an electro-hydraulic means rather than by the manual application of force to the master cylinder, the master cylinder is typically isolated from the rest of the braking system during brake operation. This changes the response characteristics at the vehicle's brake pedal from those conventionally provided and prevents the driver from experiencing the customary brake pedal travel and feel.

It is preferable that the vehicle driver experience a more conventional pedal response when applying a vehicle's brakes on a vehicle with electric or electro-hydraulic brake control. Accordingly, brake by wire systems include ancillary components to approximate conventional pedal characteristics during brake application. These ancillary components increase costs and require additional space.

SUMMARY OF THE INVENTION

The present invention provides a master cylinder that supplies the typical brake pedal travel and feel characteristics to a brake system when the master cylinder is isolated from the wheel brakes. This is accomplished by providing a pedal feel emulator assembly between the primary piston of the master cylinder and the brake pedal push rod. The emulator assembly utilizes a dual piston primary piston unit in cooperation with the master cylinder. The primary piston unit is movable against spring and fluid forces upon the application of manual pressure to the brake pedal, even when the primary piston is substantially immovable due to isolation of the master cylinder from the remainder of the braking system.

The master cylinder and emulator preferably includes a body having a stepped longitudinal bore and at least one transverse bore. A fluid reservoir is carried near the body and communicates with the transverse bore. A compensation port extends through the body between the transverse bore and the longitudinal bore providing a means of communicating fluid between the master cylinder and the reservoir.

A primary piston unit is slidably carried in the stepped longitudinal bore of the master cylinder and emulator. The primary piston unit separates the stepped longitudinal bore into, at least, a high pressure chamber that communicates with the brake system and a variable chamber. A valve assembly including a flow restrictive orifice is provided between the variable chamber and the reservoir.

An emulator piston is slidably carried in the stepped longitudinal bore on the variable chamber side of the primary piston unit. The emulator piston preferably has a post extending toward the primary piston unit. The emulator piston is movable between an at-rest position and a range of apply positions while the primary piston unit remains substantially unmoved.

At least one spring or other compliant material or device extends between the primary piston unit and the emulator piston. The compensation port of the transverse bore communicates with the stepped longitudinal bore at the side of the primary piston unit through the valve assembly and flow restrictive orifice.

According to a preferred aspect of the present invention, when the emulator piston is moved from the at-rest position, fluid in the variable chamber of the stepped longitudinal bore between the primary piston unit and the emulator piston is forced through an opening in the body and is communicated to the braking system. The fluid provides an apply assist to precharge the system manually at the initial instant of pedal actuation. The apply assist fluid takes up the compliancy of the brake system and initiates movement of brake pads toward contact with their mating braking surfaces.

In operation, when force is applied to the braking pedal of a vehicle incorporating the present invention and the master cylinder is isolated from the remainder of the hydraulic braking system, the push rod applies the pedal force to the emulator piston which is movable against the spring and fluid forces providing the customary brake pedal travel and feel. This occurs while the primary piston remains substantially immovable due to the non-compressibility of the braking fluid.

According to a preferred embodiment of the present invention, the spring force is provided by a combination of an inner spring and a stronger outer spring. The inner spring resists movement of the emulator piston upon the initial application of pedal force. The outer spring initially provides no force against movement of the push rod piston. When a selected amount of movement has occurred, the emulator piston operates against the force of both the outer and the inner springs during further travel of the brake pedal.

Additional resistance to movement of the emulator piston is provided by fluid force created by the flow restrictive orifice in the valve assembly. The flow restrictive orifice meters the flow of fluid out from a compliant chamber between the emulator piston and the primary piston unit. The fluid flows from the compliant chamber into the reservoir of the master cylinder assembly. The amount of restriction provided by the flow restrictive orifice is designed according to the application and the selected pedal travel and feel characteristics desired for the system.

The emulator piston is designed so that after a selected amount of travel it effects movement of the primary piston ensuring that the master cylinder can be utilized to provide a pressure source for braking application in a conventional manner when desired or needed. In such operation, the master cylinder's pistons can be manually moved to pressurize the braking system.

DETAILED DESCRIPTION OF THE PRESENTLY PREFERRED EMBODIMENT

Figure 1:
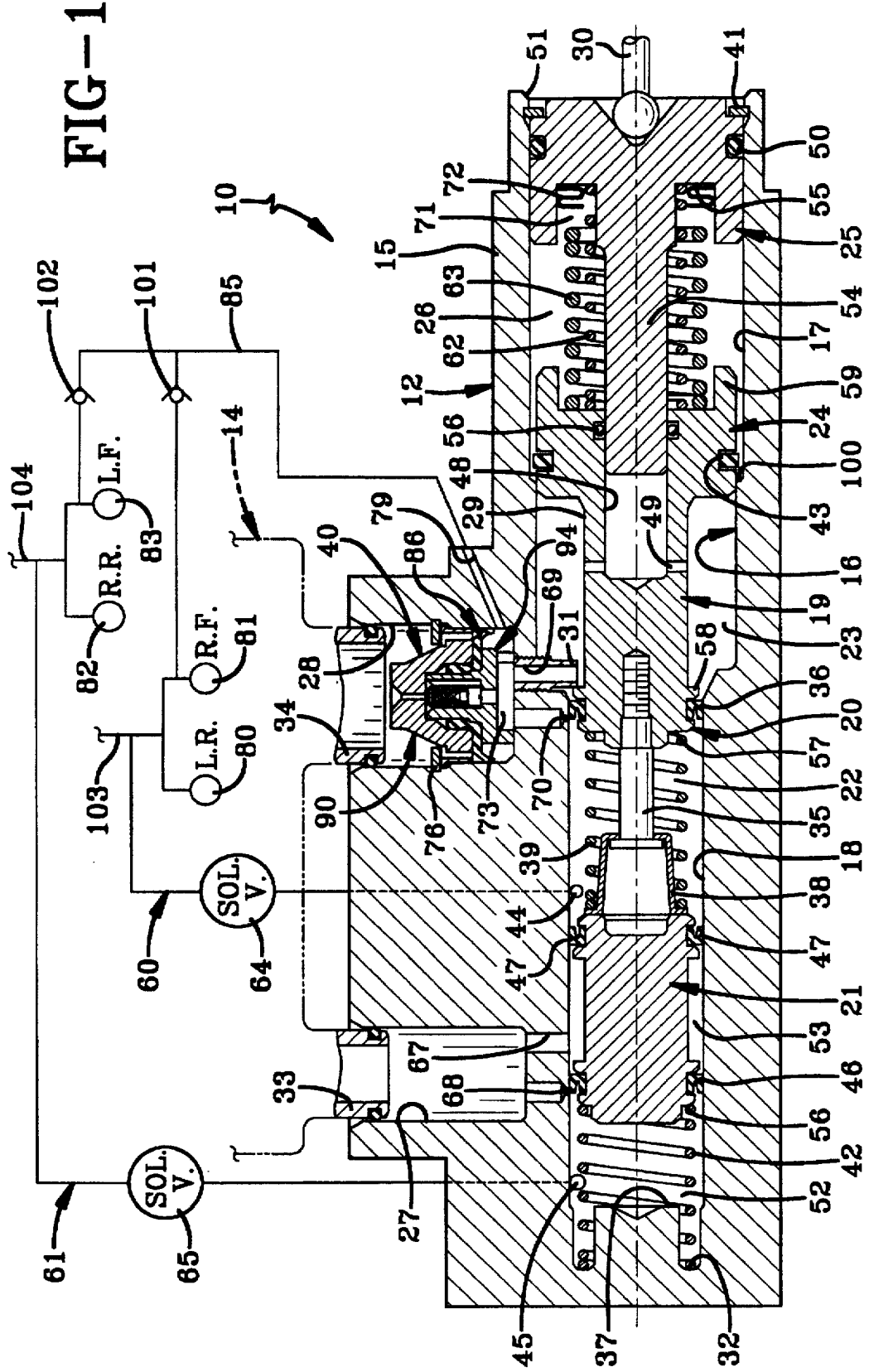
FIG. 1 is a fragmentary cross sectional view of a brake system including a master cylinder and emulator.

Referring to the drawings, illustrated in FIG. 1 is a brake system in accordance with the present invention designated in the aggregate as 10. Brake system 10 includes a master cylinder and emulator assembly 12. The master cylinder and emulator assembly 12 includes a body 15 formed of an acceptably rigid material such as metal or plastic and an associating fluid reservoir 14. The master cylinder and emulator assembly 12 is responsive to the manual application of force to a brake pedal (not illustrated), through the push rod 30.

A stepped longitudinal bore 16 extends through body 15 and slidably carries a plural piston arrangement including primary piston unit 19, secondary master cylinder piston 21 and emulator piston 25. The primary piston unit 19 is arranged in a subassembly that includes primary master cylinder piston 20 and intermediate piston 24 which, in the present embodiment are formed together as one piece. A spring retainer 38 is slidably retained on primary master cylinder piston 20 by means of fastener 35. A return spring 39 is carried between spring retainer 38 and shoulder 57 of primary master cylinder piston 20.

The primary piston unit subassembly also includes a seal 36 carried in a circumferential groove between shoulder 57 and shoulder 58 of primary master cylinder piston 20. The seal 36 bears against the wall of stepped longitudinal bore 16 in master cylinder bore 18 and provides fluid separation between primary high pressure master cylinder chamber 22 and intermediate chamber 23.

A seal 43 is carried on intermediate piston 24 and bears against the wall of stepped longitudinal bore 16 in emulator bore 17. The seal 43 effects fluid separation between intermediate chamber 23 and variable chamber 26 when positioned to the left of step 100 and provides fluid communication between intermediate chamber 23 and variable chamber 26 when positioned to the right of step 100. Seals 36 and 43 of primary piston unit 19 define movable boundaries of variable chamber 26 and primary high pressure master cylinder chamber 22 in stepped longitudinal bore 16 as detailed below.

Primary piston unit 19 includes a longitudinal bore 48 that enters through the intermediate piston 24 opening to variable chamber 26 and extends partially through the primary piston unit 19. A cross bore 49 extends through primary piston unit 19 intersecting longitudinal bore 48. The longitudinal bore 48 is in constantly open fluid communication with the intermediate chamber 23 through the cross bore 49.

The primary piston unit 19 and specifically, the primary master cylinder piston 20 is operable to selectively pressurize a braking circuit 60, through the outlet opening 44. The braking circuit 60 is connected with left rear wheel brake 80 and right front wheel brake 81 in a diagonally split arrangement. The braking circuit 60 includes a normally open valve 64 that is selectively closed to isolate primary high pressure master cylinder chamber 22 from the wheel brakes 80 and 81.

Secondary master cylinder piston 21 is substantially spool-shaped and is slidably carried in master cylinder bore 18 of stepped longitudinal bore 16 to the left of primary master cylinder piston 20 as viewed in FIG. 1. Secondary master cylinder piston 21 is engaged by spring retainer 38 of the primary piston unit subassembly. A return spring 42 extends between the shoulder 56 of secondary master cylinder piston 21 and the spring seat 32 at blind end 37 of the stepped longitudinal bore 16. The return spring 42 biases the secondary master cylinder piston 21 toward the primary master cylinder piston 20.

Secondary master cylinder piston 21 carries a primary seal 46 fluidly separating master cylinder bore 18 into secondary high pressure master cylinder chamber 52 and secondary low pressure master cylinder chamber 53. Secondary master cylinder piston 21 also carries a secondary seal 47 that separates secondary low pressure master cylinder chamber 53 from primary high pressure master cylinder chamber 22 within the master cylinder bore 18.

The secondary master cylinder piston 21 is operable to selectively pressurize a braking circuit 61, through the outlet opening 45. The braking circuit 61 is connected with right rear wheel brake 82 and left front wheel brake 83 in a diagonally split arrangement. The braking circuit 61 includes a normally open valve 65 that is selectively closed to isolate secondary high pressure master cylinder chamber 52 from the wheel brakes 82 and 83.

Master cylinder body 15 includes transverse bores 27 and 28 which are adapted to receiving bayonets 33 and 34 respectively, of reservoir 14. A compensation port 67 provides an opening between transverse bore 27 and master cylinder bore 18 into secondary low pressure chamber 53. A bypass hole 68 provides an opening between transverse bore 27 and master cylinder bore 18 into secondary high pressure chamber 52 when the secondary master cylinder piston 21 is in the at-rest position shown in FIG. 1. When the secondary master cylinder piston 21 is moved to an apply position the primary seal 46 is moved to a position to the left, (as viewed in FIG. 1), of bypass hole 68 so that the bypass hole 68 provides an opening between transverse bore 27 and secondary low pressure master cylinder chamber 53.

Similarly, a compensation port 69 provides an opening between transverse bore 28 and stepped longitudinal bore 16 into intermediate chamber 23. Additionally, a bypass hole 70 provides an opening between transverse bore 28 and stepped longitudinal bore 16 into primary high pressure master cylinder chamber 22 when the primary master cylinder piston 20 is in the at-rest position shown in FIG. 1. When the primary master cylinder piston 20 is moved to an apply position, the seal 36 is moved to a position to the left, (as viewed in FIG. 1), of bypass hole 70 so that the bypass hole 70 provides an opening between transverse bore 28 and intermediate chamber 23. The compensation ports 67, 69 and the bypass holes 68, 70 provide fluid routes between the reservoir 14 and the stepped longitudinal bore 16.

The primary piston unit 19 resembles a spool and includes an annular undercut 29 formed around its circumference defining intermediate chamber 23 with the wall of stepped longitudinal bore 16. The seal 36 operates to permit fluid compensation flow into the primary high pressure master cylinder chamber 22 from the intermediate chamber 23 when the primary master cylinder piston 20 moves back to the illustrated at-rest position from the apply position.

A stop pin 31 is threaded into the body 15 and forms the compensation port 69. The stop pin 31 engages shoulder 58 to limit travel of primary piston unit 19 to the right as viewed in FIG. 1. The primary piston unit 19 is biased toward the stop pin 31 by return spring 39.

During operation of the associating braking system 10, the primary high pressure master cylinder chamber 22 and the secondary high pressure master cylinder chamber 52 typically become closed off and isolated from the remainder of the braking system 10 by valves 64 and 65 preventing the communication of fluid through outlet openings 44 and 45. This means that the primary piston unit 19 becomes substantially immovable due to the non-compressible fluid trapped in the chambers 22 and 52. To provide desirable feel and travel characteristics to the brake pedal, compliancy is provided in the system by means of the emulator piston 25.

Emulator piston 25 is slidably carried in emulator bore 17 and is maintained therein by retaining ring 41. The emulator piston 25 carries seal 50 to maintain the fluid tight integrity of the rear opening 51 to stepped longitudinal bore 16. The emulator piston 25 also includes a post 54 which extends toward the primary piston unit 19 and is coupled therewith by extending into longitudinal bore 48. A seal 56 is positioned in intermediate piston 24 around longitudinal bore 48 and bears against post 54.

A spring seat 55 is formed in emulator piston 25 coaxially about post 54 and facing variable chamber 26. Similarly, a spring seat 59 is formed in intermediate piston 24 coaxially about longitudinal bore 48. A spring 62 extends between spring seat 55 and spring seat 59 biasing emulator piston 25 toward the retaining ring 41. The spring 62 continuously engages both the primary piston unit 19 at intermediate piston 24 and the emulator piston 25. A spring 63 encircles the spring 62 and extends substantially between the intermediate piston 24 and the emulator piston 25. However, with the emulator piston 25 in the at-rest position shown, when the spring 62 engages the spring seat 59 of primary piston unit 19 there exists a space between the fully extended spring 63 and the spring seat 55 of emulator piston 25 sufficient for clearance 71 and spring 72. Spring 72 is substantially annular in shape and is held in spring seat 55 by springs 62 and 63.

A greater load is required to deflect the springs 63 and 72 than is required to deflect spring 62. Therefore, after sufficient travel of emulator piston 25 during a brake apply to take up the clearance 71, the force required for further movement is increased significantly. This is because further movement in excess of clearance 71 requires compression of both the spring 62 and the combination of springs 63 and 72. The addition of spring 62 with springs 63 and 72 provides a close approximation of conventional brake application response at the push rod 30 while the primary piston unit 19 remains effectively stationary. Since the spring length and stiffness directly effect the pedal travel versus pedal force characteristic of the system, the particular spring or compliant material design is tailored for the particular application and therefore, the specific arrangement may vary within the scope of the present invention.

The emulator piston 25 operates to provide a preselected response at the push rod 30 when actuated during a braking event that effects isolation of the master cylinder assembly from the vehicle's wheel brakes 80–83. When force is applied to the associating brake pedal, push rod 30 is caused to apply force to emulator piston 25 such that movement of the emulator piston 25 occurs. Fluid is forced from the variable chamber 26 around the outside diameter of seal 43 and communicated into intermediate chamber 23.

The fluid is contained in intermediate chamber 23 and intermediate chamber 26 by the seal 50 and the seal 36 which is held against the wall of stepped longitudinal bore 16 by trapped fluid in primary high pressure master cylinder chamber 22. Therefore, the fluid transmission effected into intermediate chamber 23 by displacement of emulator piston 25 is directed through compensation port 69 to transverse bore 28.

Figure 2:
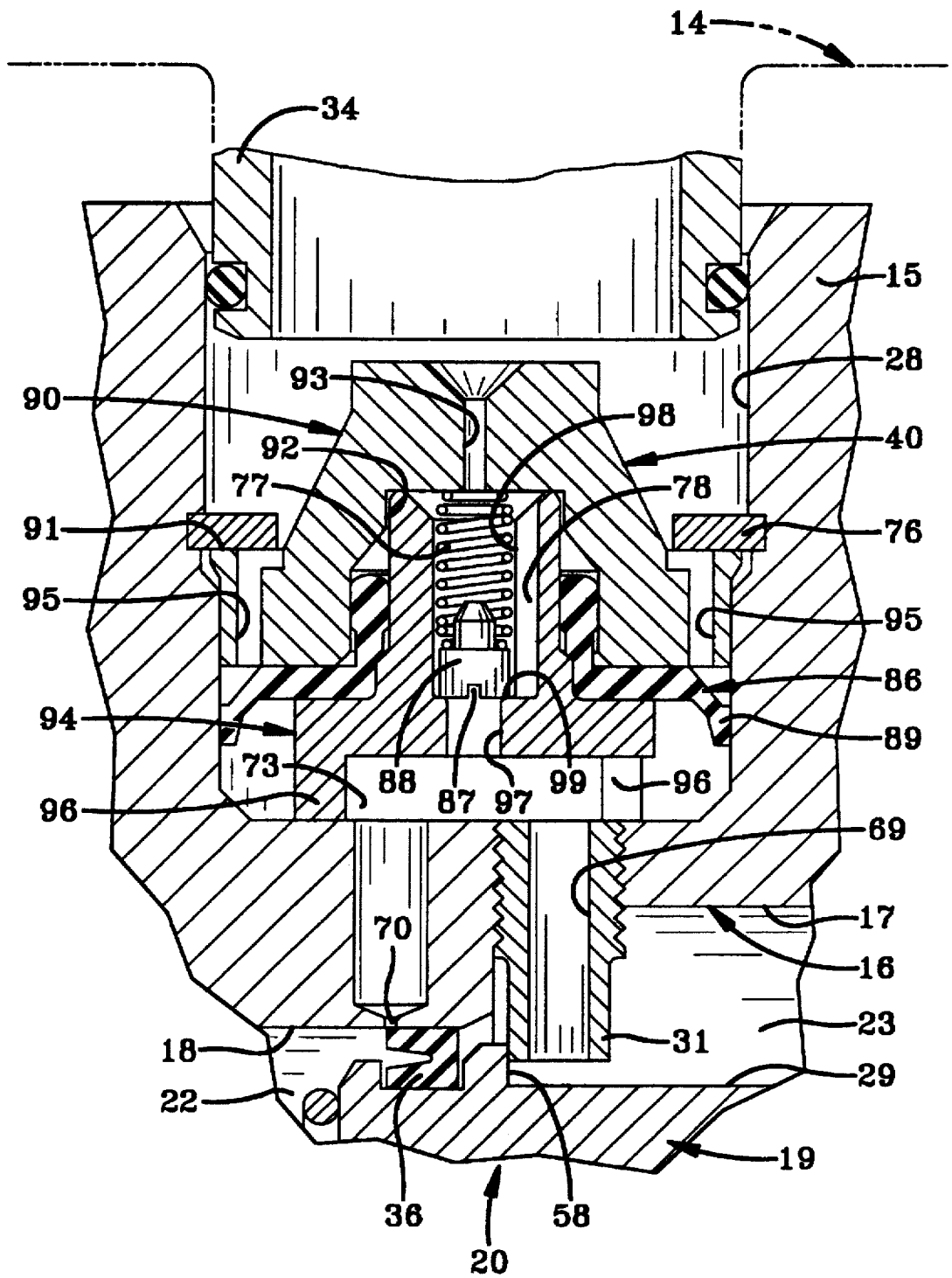
FIG. 2 is a fragmentary cross sectional detail illustration of a portion of a master cylinder and emulator illustrated in FIG. 1.

Referring to FIG. 2, the area of transverse bore 28 is illustrated in greater detail. A valve assembly 40 is positioned in transverse bore 28 separating off a chamber 73. The chamber 73 is open to the compensation port 69 and the bypass hole 70. The valve assembly 40 is maintained in the transverse bore 28 by a retaining ring 76.

The valve assembly 40 includes a valve body 90 that includes an annular shoulder 91 engaging retaining ring 76.

A central opening extends through the valve body 90 and includes bore 93 and stepped bore 92. The stepped bore 92 receives a second valve body 94 with a seal 86 captured between the two valve bodies 90 and 94. The seal 86 includes a deflectable lip 89 that engages the wall of transverse bore 28. The valve body 90 includes a series of bypass openings 95 that provide a one-way bypass around the central opening formed by bores 93 and 92. Flow through the bypass openings is allowed into chamber 73 by deflecting lip 89. The lip 89 allows rapid fluid compensation from the reservoir 14 to the compensation port 69 and bypass hole 70. However, the lip 89 prevents the flow of fluid from the chamber 73 to the bypass openings 95.

The valve body 94 includes a plurality of legs 96 that support the valve body and compress the seal between the bodies 90, 94. The body 94 also includes an opening formed by bores 97 and 98 that registers with the central opening of the body 90. The bore 98 carries a moveable valve element 88 that is biased toward seat 99 by spring 77. The moveable valve element 88 includes a slot 87 that serves as a fixed open orifice that provides pedal feel damping on normal brake applies by providing a metered open means of communication in the flow path between the variable chamber 26 and the reservoir 14. A slot 78 is cut in the body 94 from, bore 98 to assist fluid communication between the slot 87 and the bore 98. The preload set on the moveable valve element 88 by the spring 77 determines the pressure differential that is required to move the element 88 off the seat 99. Once unseated the flow rate of fluid through the flow path from the variable chamber 26 to the reservoir 14 is substantially increased.

The flow restrictive orifice 87 provides a continuously open flow route around the seal 86 and is specifically designed to permit compliancy of the system while providing a selected amount of resistance in the form of fluid force operating against movement of the emulator piston 25 toward the primary piston unit 19. This resistance creates a back pressure in the variable chamber 26 that is utilized to effect flow augmentation to the wheel brakes 80–83 at the initiation of a rapid brake apply.

Referring again to FIG. 1, an opening 79 is provided through the body 15 to chamber 73. A branched conduit 85 is provided between the opening 79 and the braking circuits 60 and 61. The conduit 85 includes check valves 101 and 102 which limit the flow of fluid through the conduit 85 to one direction. Fluid flow is permitted from the variable chamber 26 to the wheel brakes 80–83 but is prevented from the wheel brakes 80–83 to the variable chamber 26.

In the event of rapid brake apply as effected by manual force input to push rod 30, the orifice restriction provided by slot 87 restricts fluid escape from the variable chamber 26. Prior to the generation of sufficient fluid pressure to unseat the moveable valve element 88, when there is initially no pressure at the wheel brakes 80–83, fluid flows from the variable chamber 26 through the branched conduit 85. This assists the overall system response time during rapid brake apply by precharging the brake system 10, overcoming system compliance and initiating actuation of the wheel brakes 80–83. After the initial instantaneous assist, the electric or electro-hydraulically controlled brake system (not illustrated), with the valves 64 and 65 closed, takes over and effects braking operation through the conduits 103 and 104 to the wheel brakes 80–83. As pressure at the wheel brakes 80–83 builds in response, the check valves 101 and 102 close and the emulator assembly operates to provide the selected pedal response and feel through the push rod 30.

When the manually applied force is removed from the push rod 30, the springs 62, 63 and 72, force the emulator piston 25 to return to the at-rest position illustrated. The spring return of the emulator piston 25 is not assisted by fluid force since the fluid source is the unpressurized reservoir 14. Under the operation of the springs 62, 63 and 72, fluid is drawn to return from the reservoir 14 through the valve assembly 40 to fill the expanding variable chamber 26. The returning fluid travels freely past the deflectable lip 89 of seal 86.

As a means of ensuring that the master cylinder and emulator assembly 12 is operable without excessive increase in pedal travel in the no-power assist mode, to apply braking pressure by movement of the pistons 20, 21 if a sufficient amount of force is applied to the push rod 30, the seal 43 will travel to the left of step 100 and sealingly engage the wall of bore 17. At this position, seals 43, 50 and 56 isolate the non-compressible fluid in the variable chamber 26. This forms a hydraulic lock in the variable chamber 26 and therefore, does not add additional travel to the no-power apply condition. This enables pressurization of the high pressure chambers 22 and 52 for the application of fluid pressure through the outlet openings 44 and 45 to the associating braking system. During such operation the valves 64, 65 are placed in their normally open positions. Therefore, the master cylinder and emulator 12 provides a default mode of operation of the braking system 10 by means of a manual mechanism to actuate wheel brakes 80-83, when required.

Figure 3:
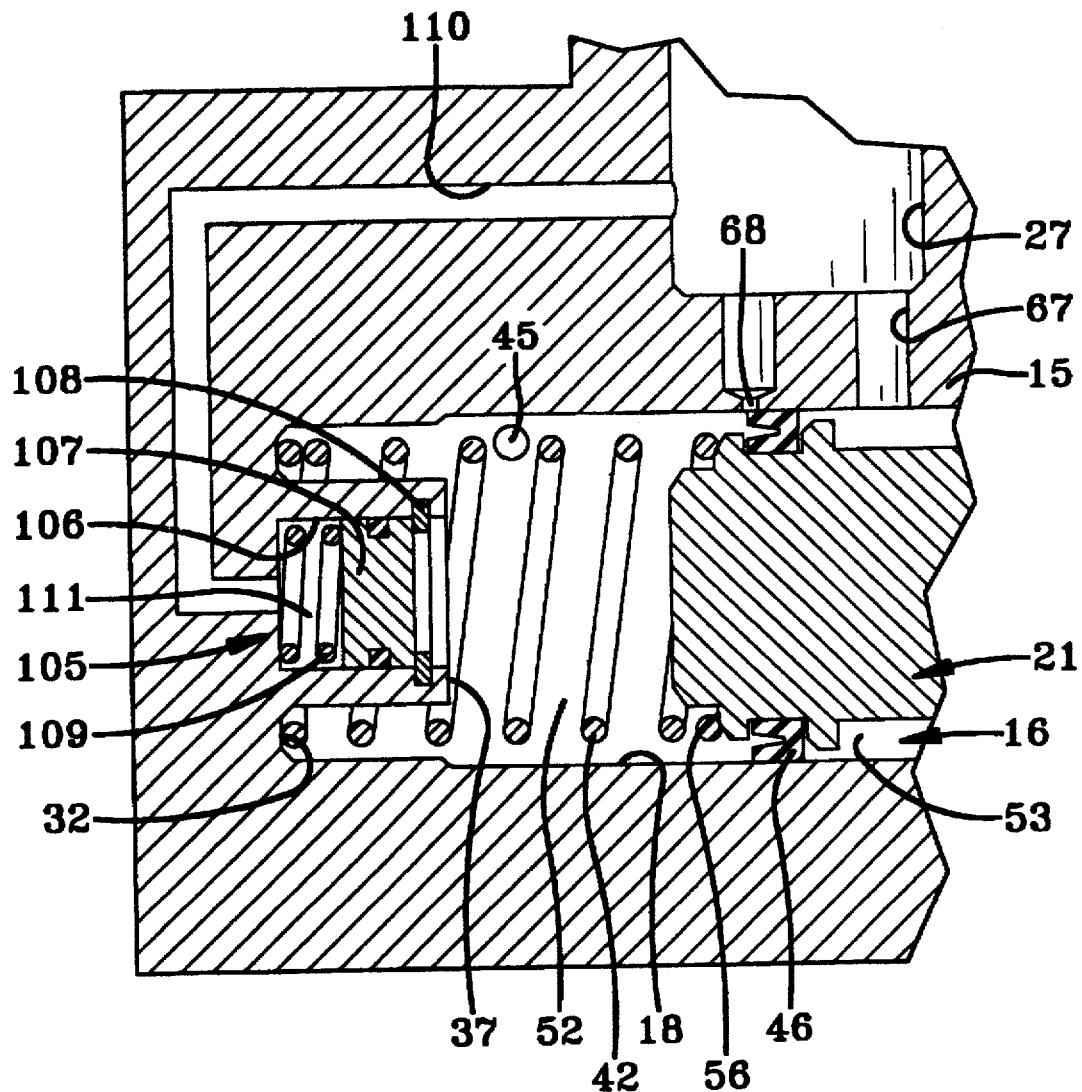
FIG. 3 is a fragmentary cross sectional detail illustration of the blind end of the master cylinder bore of an alternative embodiment of the present invention.

Referring to FIG. 3 an alternative embodiment of the present invention is illustrated. This embodiment is substantially the same as the embodiment of FIGS. 1 and 2 with the addition of a compliant assembly 105 at the end 37 of stepped longitudinal bore 16. The compliant assembly includes a bore 106 which carries a slidable piston and seal assembly 107 that is retained in the bore 106 by a retaining ring 108 and separates a compliant chamber 111 off within the bore 106. The piston and seal assembly is biased toward the retaining ring by a spring 109. A conduit 110 extends between the bore 106 and the transverse bore 27 which is open to the reservoir 14.

The piston and seal assembly 107 has a small amount of displacement to permit a sufficient amount of travel of the primary and secondary master cylinder pistons 20 and 21 to permit the seals 36 and 46 to travel to the left, as viewed in FIG. 1, past the bypass holes 70 and 68, respectively. This is provided so that during electric or electro-hydraulic operation of the brake system 10 effecting wheel brake actuation through the conduits 103, 104, damage such as nipping of the seals 36, 46 by the bypass holes 70, 68 is avoided when required such as when high pressures are generated in the chambers 22, 52.

What is claimed is:

1. A master cylinder for operation in a brake system with wheel brakes comprising:

a body having a longitudinal bore and having a primary and secondary transverse bores extending into the body;

a reservoir carried on the body and communicating with the primary and secondary transverse bores with a compensation port and a bypass hole extending through the body between each transverse bore in the longitudinal bore;

a primary piston unit slidably carried in the longitudinal bore having a first side and a second side;

a fastener connected to the second side of the primary piston;

a spring retainer slidably carried on the fastener;

a return spring compressibly extending between the spring retainer and the primary piston unit;

a secondary piston slidably carried in the longitudinal bore on the second side of the primary piston unit and engaging the spring retainer;

an emulator piston slidably carried in the longitudinal bore on the first side of the primary piston unit wherein a variable chamber is defined between the primary piston unit and the emulator piston in the longitudinal bore, the emulator piston having a post extending toward the primary piston unit the emulator piston being moveable between an at-rest position and a pluralitry of apply positions while the primary piston unit remains substantially unmoved;

an first spring extending between and continuously engaging both the primary piston unit and the emulator piston;

a second spring encircling the first spring and substantially extending between the primary piston unit and the emulator piston and having clearance so that the second spring does not engage both the primary piston unit and the emulator piston when the emulator piston is in the at-rest position;

a third spring carried in the clearance between the second spring and the emulator piston;

wherein the compensation port of the primary bore communicates with the variable chamber so that when the emulator piston is moved from the at-rest position while the primary piston unit and the secondary piston remain unmoved, fluid in the variable chamber between the primary piston unit and the emulator piston is forced to flow through the compensation port to the reservoir; and an outlet opening extending through the body to the variable chamber wherein fluid flow through the outlet opening precharges the brake system through a conduit and assists in actuation of the wheel brakes.

2. A master cylinder according to claim 1 wherein the flow restrictive orifice is provided in a valve assembly carried in the transverse bore.

3. A master cylinder according to claim 1 wherein the longitudinal bore includes an end on the second side of the primary unit and further comprising a compliant assembly positioned in the end of the longitudinal bore including a displaceable piston and seal assembly separating a compliant chamber off the longitudinal bore wherein the compliant chamber is open to the reservior through a conduit.

4. A master cylinder for operation in a brake system with wheel brakes comprising:

a body having a longitudinal bore and having a transverse bore extending into the body;

a reservoir carried near the body and communicating with the transverse bore with a compensation port extending through the body between the transverse bore and the longitudinal bore;

a primary piston unit slidably carried in the longitudinal bore having a first side and a second side wherein a variable chamber is defined in the longitudinal bore on the first side of the primary piston unit;

wherein a flow path is defined between the reservoir and the variable chamber, the flow path including the transverse bore and the compensation port with a flow restrictive orifice defined in the flow path;

an emulator piston slidably carried in the longitudinal bore on the first side of the primary piston unit wherein the variable chamber is defined between the primary piston unit and the emulator piston, the emulator piston having a post extending into the variable chamber toward the primary piston unit, the emulator piston being movable between an at-rest position and a plurality of apply positions while the primary piston unit remains substantially unmoved wherein the variable chamber is contractible and expansible;

wherein the compensation port of the transverse bore communicates with the variable chamber through the flow path so that when the emulator piston is moved from the at-rest position fluid in the variable chamber is forced through the compensation port and the flow restrictive orifice to the reservoir; and an outlet opening extending through the body to the variable chamber wherein fluid flow through the outlet opening precharges the brake system through a conduit and assists in actuation of the wheel brakes while the primary piston remains unmoved.

5. A master cylinder according to claim 4 wherein the flow restrictive orifice is provided in a valve assembly carried in the transverse bore.

6. A master cylinder according to claim 4 wherein the longitudinal bore includes an end on the second side of the primary piston unit and further comprising a compliant assembly positioned in the end of the longitudinal bore including a displaceable piston and seal assembly separating a compliant chamber off from the longitudinal bore wherein the compliant chamber is open to the reservoir through a conduit.

7. A master cylinder for operation in a brake system including wheel brakes comprising:

a body having a longitudinal bore and having a transverse bore extending into the body;

a reservoir carried on the body and communicating with the transverse bore with a compensation port extending through the body between the transverse bore and the longitudinal bore;

a primary piston unit slidably carried in the longitudinal bore having a first side and a second side wherein a variable chamber is defined in the longitudinal bore on the first side of the primary piston unit;

wherein a flow path is defined between the reservoir and the variable chamber, the flow path including the transverse bore and the compensation port with a flow restrictive orifice defined in the flow path;

a seal providing a one way bypass around the flow restrictive orifice providing free flow from the reservoir to the variable chamber and preventing flow through the one way bypass from the compliant chamber to the reservoir;

an emulator piston slidably carried in the longitudinal bore on the first side of the primary piston unit wherein the variable chamber is defined between the primary piston unit and the emulator piston, the emulator piston having a post extending into the variable chamber toward the primary piston unit, the emulator piston being movable between an at-rest position and a plurality of apply positions while the primary piston unit remains substantially unmoved wherein the variable chamber is contractible and expansible;

wherein the compensation port of the transverse bore communicates with the variable chamber through the flow path so that when the emulator piston is moved from the at-rest position fluid in the variable chamber is forced through the compensation port and the flow restrictive orifice to the reservoir; and an outlet opening extending through the body to the variable chamber wherein fluid flow through the outlet opening precharges the brake system through a conduit and assists in actuation of the wheel brakes.

8. A master cylinder according to claim 7 wherein the flow restrictive orifice is provided in a valve assembly carried in the transverse bore.

9. A master cylinder according to claim 7 wherein the longitudinal bore includes an end on the second side of the primary piston unit and further comprising a compliant assembly positioned in the end of the longitudinal bore including a displaceable piston and seal assembly separating a compliant chamber off from the longitudinal bore wherein the compliant chamber is open to the reservoir through a conduit.

10. A master cylinder for operation in a brake system with wheel brakes comprising:

a body;

a primary piston unit carried in the body moveable to actuate at least one of the wheel brakes through a first wheel brake circuit connected to a first outlet opening in the body;

a secondary piston carried in the body moveable to actuate at least one of the wheel brakes through a second brake circuit connected to a second outlet opening in the body;

an emulator piston carried in the body defining a variable chamber between the primary piston unit and the emulator piston with a third outlet opening in the body opening to the variable chamber wherein a conduit extends between the third outlet opening and at least one of the first and second brake circuits; and a reservoir carried on the body and a longitudinal bore in the body that carries the primary piston unit, the secondary piston and the emulator piston, wherein the longitudinal bore includes an end and further comprising a compliant assembly positioned in the end of the longitudinal bore including a displaceable piston and seal assembly separating a compliant chamber off from the longitudinal bore wherein the compliant chamber is open to the reservoir through a conduit.

* * * * *